(12) United States Patent
Hambloch et al.

(10) Patent No.: US 9,624,878 B2
(45) Date of Patent: Apr. 18, 2017

(54) NON-RETURN VALVE DEVICE FOR AN INTERNAL COMBUSTION ENGINE

(71) Applicant: PIERBURG GMBH, Neuss (DE)

(72) Inventors: Stephan Hambloch, Inden (DE); Lars Baumeister, Nettetal (DE); Jessica Jasper, Krefeld (DE)

(73) Assignee: PIERBURG GMBH, Neuss (DE)

( * ) Notice: Subject to any disclaimer, the term of this patent is extended or adjusted under 35 U.S.C. 154(b) by 158 days.

(21) Appl. No.: 14/412,457

(22) PCT Filed: Jun. 25, 2013

(86) PCT No.: PCT/EP2013/063270
§ 371 (c)(1),
(2) Date: Jan. 2, 2015

(87) PCT Pub. No.: WO2014/005884
PCT Pub. Date: Jan. 9, 2014

(65) Prior Publication Data
US 2015/0159591 A1    Jun. 11, 2015

(30) Foreign Application Priority Data
Jul. 4, 2012    (DE) .................. 10 2012 105 971

(51) Int. Cl.
*F02M 26/10*    (2016.01)
*F16K 15/16*    (2006.01)
(Continued)

(52) U.S. Cl.
CPC ............ *F02M 26/10* (2016.02); *F02M 26/40* (2016.02); *F16K 15/16* (2013.01); *F16K 27/0209* (2013.01); *F16K 27/0227* (2013.01)

(58) Field of Classification Search
CPC ......... Y10T 137/7891; Y10T 137/7892; Y10T 137/7893; F16K 15/16; F16K 27/0227; F16K 27/0209

USPC ........ 137/512, 512.1, 512.15, 855, 856, 857
See application file for complete search history.

(56) References Cited

U.S. PATENT DOCUMENTS 3,412,754 A * 11/1968 Schou ................ F01L 3/205
                                                137/454.2
3,981,276 A *  9/1976 Ernest ............... F02B 53/06
                                                123/242
(Continued)

FOREIGN PATENT DOCUMENTS

CN    201739030 U    2/2011
DE    1 035 994 B    8/1958
(Continued)

*Primary Examiner* — Mary McManmon
*Assistant Examiner* — Richard K Durden
(74) *Attorney, Agent, or Firm* — Norman B. Thot

(57) ABSTRACT

A non-return valve device for an internal combustion engine includes a valve housing comprising an aperture with a downstream end arranged in a duct housing. The aperture defines a flow cross section. A valve seat surrounds the flow cross section. A valve closing member, provided as leaf springs, adapts, closes or opens the flow cross section. A distance between each of the leaf springs in their maximum opened position at the downstream end of the aperture and the duct housing arranged opposite to each of the leaf springs has a maximum which is twice as large as a distance between each of the leaf springs in their maximum opened position and the valve seat arranged opposite to each of the leaf springs. Defining inner walls of the duct housing downstream of the valve housing are arranged so that the flow cross section is first continuously reduced and then continuously enlarged.

19 Claims, 7 Drawing Sheets

(51) Int. Cl.
   *F16K 27/02*   (2006.01)
   *F02M 26/40*   (2016.01)

(56) References Cited

U.S. PATENT DOCUMENTS

| | | | | |
|---|---|---|---|---|
| 4,180,042 A | * | 12/1979 | Lloyd | F02M 29/04 123/590 |
| 4,228,770 A | * | 10/1980 | Boyesen | F01L 3/205 123/188.1 |
| 4,235,206 A | * | 11/1980 | Boyesen | F01L 3/205 123/73 A |
| 4,290,455 A | | 9/1981 | Honda et al. | |
| 5,245,956 A | * | 9/1993 | Martin | F01L 3/205 123/73 V |
| 2002/0134081 A1 | | 9/2002 | Shiraishi et al. | |
| 2003/0110768 A1 | * | 6/2003 | Coleman | F02B 33/44 60/605.2 |
| 2007/0131285 A1 | | 6/2007 | Zika-Beyerlein et al. | |

FOREIGN PATENT DOCUMENTS

| | | |
|---|---|---|
| DE | 29 26 164 A1 | 1/1980 |
| DE | 20 2005 019 518 U1 | 4/2007 |
| DE | 10 2009 007 609 A1 | 8/2010 |
| EP | 1 098 085 A2 | 5/2001 |
| EP | 1 243 779 A2 | 9/2002 |
| EP | 1 795 730 A2 | 6/2007 |
| EP | 2 133 547 A1 | 12/2009 |
| GB | 1 371 919 A | 10/1974 |
| JP | 58-172157 U | 11/1983 |
| JP | 59-155673 A | 9/1984 |
| JP | 2-59223 U | 4/1990 |
| JP | 9-242551 A | 9/1997 |
| JP | 2002-089382 A | 3/2002 |
| JP | 2007-315315 A | 12/2007 |
| WO | WO 2011/088936 A1 | 7/2011 |
| WO | WO 2011/089038 A1 | 7/2011 |

* cited by examiner

ND-RETURN VALVE DEVICE FOR AN
INTERNAL COMBUSTION ENGINE

CROSS REFERENCE TO PRIOR APPLICATIONS

This application is a U.S. National Phase application under 35 U.S.C. §371 of International Application No. PCT/EP2013/063270, filed on Jun. 25, 2013 and which claims benefit to German Patent Application No. 10 2012 105 971.3, filed on Jul. 4, 2012. The International Application was published in German on Jan. 9, 2014 as WO 2014/005884 A1 under PCT Article 21(2).

FIELD

The present invention relates to a non-return valve device for an internal combustion engine which includes a duct housing, a valve housing which has at least one flow cross section and is arranged in the duct housing, at least one valve seat which surrounds the flow cross section, and at least one valve closing member via which the flow cross section can be opened or closed and which is configured as a leaf spring.

BACKGROUND

Non-return valves are in particular used in exhaust gas return lines to prevent air from flowing from the charge air line into the exhaust gas return line when the pressure in the charge air line is higher than the pressure in the exhaust gas return line due to pressure variations in the exhaust gas region. These valves are adapted to open and close as quickly as possible so that, in most cases, they are designed as flutter valves which include spring leaf elements which serve as valve closing members. Since the opening cross section of such flutter valves is limited and opening limiters in the form of stopper elements are to be provided to prevent the leaf springs from breaking, these valves are in most cases configured as multi-pass valves. Since return flows within the exhaust gas return duct are prevented by these non-return valves, the exhaust gas return rate is increased when these valves are used, which, in turn, results in a reduction of pollutants.

DE 10 2009 007 609 A1 describes a multi-pass non-return valve where the stopper elements and the valve closing members are integrally configured and inserted and/or pushed into respective holders of the housing. The flow cross sections are respectively arranged in pairs located opposite to each other.

EP 1 098 085 A2 describes a four-pass non-return valve which comprises a valve housing made up of two elements arranged like prisms relative to each other whose side faces respectively form two valve seats which define flow apertures. Each valve seat is associated with a leaf spring element acting as a closing body and a stopper element. The valve housing comprises clamping faces where the leaf springs and the stopper elements are fastened by means of screws.

CN 201 739 030 U describes a non-return valve disposed in a duct housing which is made up of two prism-shaped valve housings arranged side by side. The surrounding housing comprises a reduced portion along the valve housings to reduce the cross section of the duct housing to the cross section of a downstream throttle flap.

DE 20 2005 019 518 U1 and JP 59-155673 A describe exhaust gas non-return valves where the leaf springs, in their fully open state, extend to a location close to the surrounding housing which, in accordance with DE 20 2005 019 518 U1, comprises a reduced portion adjacent to the non-return valve.

All of the above-described non-return valve devices are disadvantageous in that return flows and swirls are produced due to the occurring pulsations in the region next to the leaf spring elements, i.e., between the leaf spring elements and the surrounding housing, or, if the leaf spring elements face each other, between them. These backward swirls increase the pressure loss and accordingly reduce the pressure gradient required for an exhaust gas return flow, which results in a reduced efficiency of the internal combustion engine.

SUMMARY

An aspect of the present invention is to provide a non-return valve device which reduces the pressure loss at the non-return valve so that fuel consumption and pollutant emissions of an internal combustion engine can be reduced by an increase of the exhaust gas return rate.

In an embodiment, the present invention provides a non-return valve device for an internal combustion engine which includes a duct housing comprising defining inner walls. A valve housing is arranged in the duct housing comprising at least one aperture comprising a downstream end. The at least one aperture is configured to define a flow cross section. At least one valve seat is configured to surround the flow cross section. At least one valve closing member is configured to adapt, close or open the flow cross section. The at least one valve closing member is configured as leaf springs and to have a maximum opened position and an overall opening height. The duct housing is configured to extend across an overall width of the valve housing in an outer region relative to the valve housing immediately in front of the downstream end of the at least one aperture. A first distance between each of the leaf springs in their maximum opened position at the downstream end of the at least one aperture and the duct housing arranged opposite to each of the leaf springs has a maximum which is twice as large as a second distance between each of the leaf springs in their maximum opened position at the downstream end and the at least one valve seat arranged opposite to each of the leaf springs. The defining inner walls of the duct housing downstream of the valve housing are arranged relative to each other so that, in a flow direction, the flow cross section is first continuously reduced to a reduced portion and then continuously enlarged.

BRIEF DESCRIPTION OF THE DRAWINGS

The present invention is described in greater detail below on the basis of embodiments and of the drawings in which.

DETAILED DESCRIPTION

Figure 1:
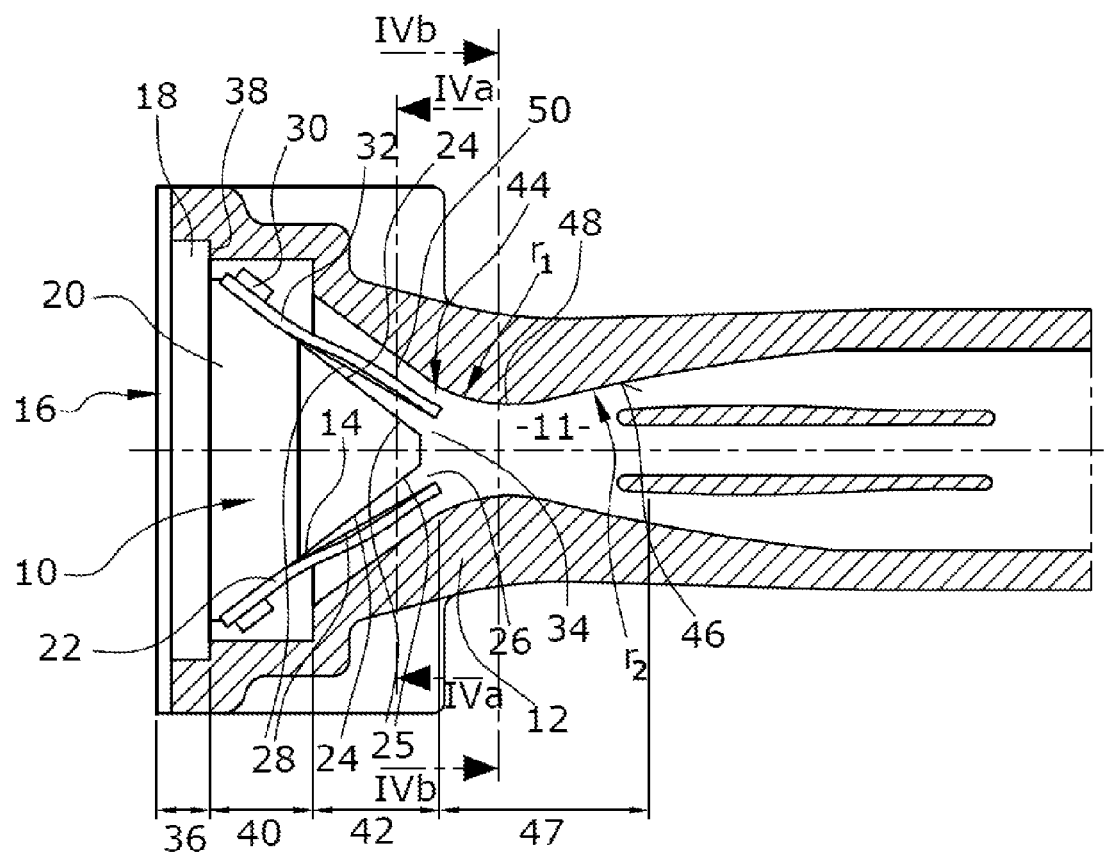
FIG. 1 shows a sectional side view of a non-return valve device according to the present invention where the radii ($r_1$ and $r_2$) of the defining inner walls of the duct housing are shown.
Figure 1A:
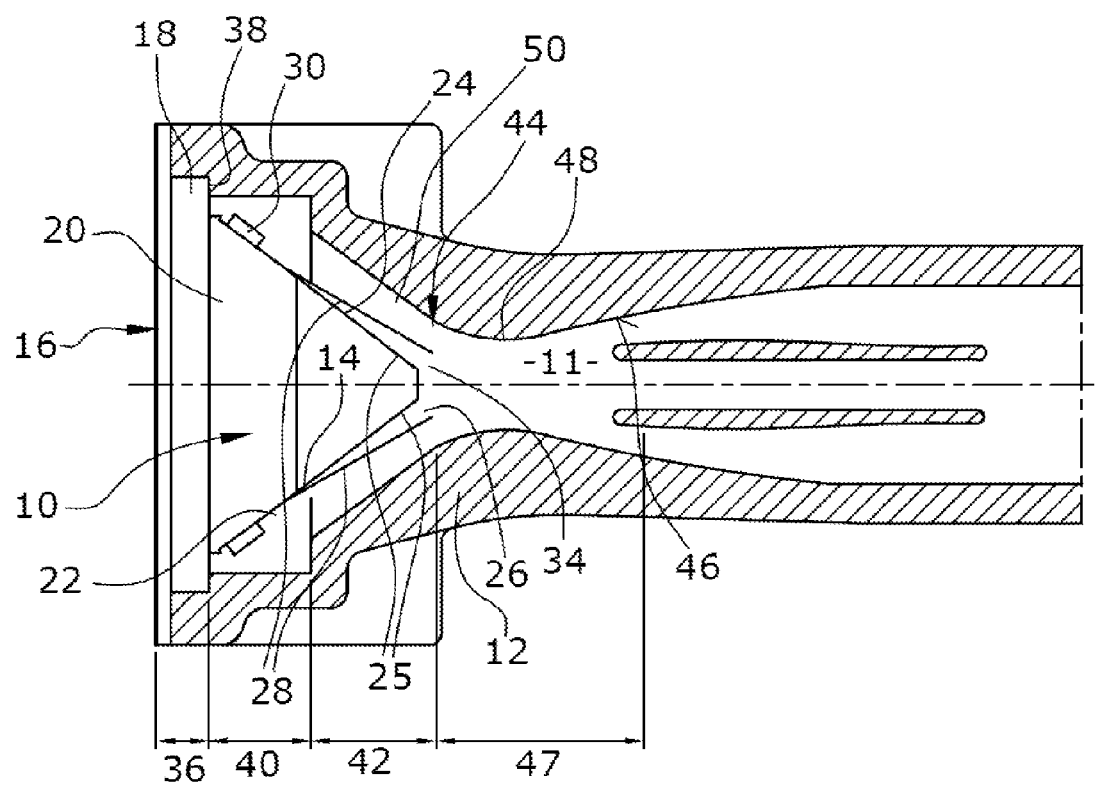
FIG. 1a shows the sectional side view of a non-return valve device according to FIG. 1 where the duct housing acts as the stopper element.

Because the duct housing and/or an insert element extend across the overall width of the valve housing in the outer region relative to the valve housing and immediately in front of the downstream end of each aperture, wherein the distance d1 between each leaf spring, in its maximum opening state, at the downstream end of each aperture and the opposing duct housing and/or insert element is at maximum twice as large as the distance d2 between each leaf spring, in its maximum opening state, at the downstream end and the opposing valve seat, wherein defining inner walls of the duct housing downstream of the valve housing are arranged relative to each other so that at first the cross section is continuously reduced and then the cross section is continuously enlarged, spaces between the surrounding housing and the valve housing in which backward flowing swirls may occur are eliminated to the greatest possible extent. The pressure loss is thus reduced and the potential exhaust gas return rate is therefore increased. A uniform flow without swirl formation and with minimum pressure loss is produced. A nozzle effect is produced due to the enlargement of the cross section following the continuous reduction of the cross section, whereby a return flow is additionally prevented. A complete trouble-free flow through the duct housing is achieved in this manner since flow obstructions and cross-sectional jumps are also avoided.

In an embodiment of the present invention, the duct housing can, for example, serve as a stopper element at the downstream end of the apertures so that additional stopper elements to be attached to the valve housing can be omitted and the gap to the duct housing is completely closed.

In an embodiment of the present invention, the valve housing can, for example, comprise a stopper element at the downstream end of the apertures, which stopper element is fastened to the valve housing. The surrounding duct housing can thus be manufactured with larger tolerances without any risk of overstressing the leaf springs.

In an embodiment of the present invention, the duct housing can, for example, extend across the overall opening height of the leaf spring in a spaced relationship to the valve seat, the spacing corresponding at maximum to three times the opening width between the leaf spring and the valve seat. The space in the lateral region relative to the leaf springs is thus closed to the greatest possible extent so that a swirl formation in a space behind the gap is prevented in the case of a return flow through the gap between the end of the leaf spring and the opposing housing.

In an embodiment of the present invention, the valve housing can, for example, be configured as a prism and comprises at least two apertures defined by the valve seat, the apertures having a distance to the surrounding duct housing corresponding to three times the maximum opening width of the leaf springs d3.

In a further development of this embodiment, the continuous enlargement of the cross section and reduction of the cross section are defined by radii ($r_1$ and $r_2$) at the inner walls of the duct housing which are easy to reproduce in the tools for manufacturing the duct housing.

In an embodiment of the present invention, the narrowest flow cross section at the end of the reduced portion of the cross section can, for example, correspond at least to the sum of the free flow cross sections of all apertures when the leaf springs are open so that cross-sectional jumps during outflow from the valve housing are prevented, whereby swirl formations and return flows are prevented to the greatest possible extent.

To guide even large flow amounts through the non-return valve device as is required in the case of engines with large piston displacement or large exhaust gas return amounts, two prism-shaped valve housings are arranged side by side in the duct housing so that the four leaf springs are disposed in series.

In an embodiment which includes two valve housings, the two valve seats facing the duct housing can, for example, have a distance d3 to the duct housing of at maximum three times the opening width of the leaf springs, and the two opposing inner valve seats, at their downstream ends, have a distance to an insert element of at maximum three times the opening width of the leaf springs, the insert element being arranged between the valve housings. Swirl formation between the two valve housings can thereby be prevented even in the inner region where the duct housing cannot serve for preventing return flows.

In an embodiment of the present invention, the insert element can, for example, extend between the two valve housings and has an arrow-shaped cross section, wherein the arms of the arrow end at the downstream end of the apertures at a distance to the apertures corresponding at maximum to three times the opening width of the leaf springs (d3). The setup and manufacture of such an insert element are simple and do not require a large amount of material.

In an embodiment of the present invention, the valve housing can, for example, comprise valve seats arranged as pyramids relative to each other, wherein the distance of the four apertures to the duct housing corresponds at maximum to three times the opening width of each leaf spring in its open state d3. A wall surface preventing a return flow and swirl formation can accordingly be produced in this case for all four apertures beside the flow apertures when the shape of the duct housing is adapted accordingly.

A non-return-valve device is thus provided where the pressure loss is reliably reduced and the feed rates can thus be increased. The setup and installation are simple since no or only few components are required. Pollutant emissions can thus be reduced.

An exemplary embodiment of the present invention is illustrated in the drawings and is described hereinafter.

The non-return valve device according to the present invention shown in FIG. 1 is made up of a non-return valve 10 arranged in a duct housing 12 which defines a duct 11. The non-return valve 10 comprises a valve housing 14 which is configured as a prism. The inlet 16 is formed at a base surface 18 of the valve housing 14 from which two parallel shell surfaces 20 and two convergent shell surfaces 22 extend into the duct housing 12.

At the convergent shell surfaces 22 apertures 24 are configured which serve as outlets 26. The apertures 24 are respectively defined by a valve seat 25 upon which a respective leaf spring 28 rests in the state in which the flow cross section is closed so that the leaf springs 28 act as valve closing members. The leaf springs 28 are fastened by screws 30 at the side of the convergent shell surfaces 22 facing the inlet, wherein the screws 30 also serve for fastening one plate-shaped stopper element 32 each which extends, like the leaf springs 28, to the greatest possible extent across the height and the width of the convergent shell surfaces 22. The stopper elements 32 are configured so that they define a maximum opening width 34 of the leaf springs 28 at the side opposite to the inlet 16.

The surrounding duct housing 12 comprises a first portion 36 serving for definingly accommodating the base surface 18 of the valve housing 14. An adjacent constriction 38, from which the duct housing 12 further extends in a straight line in a second portion 40 with a slightly reduced cross section, serves as a stopper for the base surface 18 of the valve housing 14. The second portion 40 is defined by another constriction extending towards the center axis up to a distance to the valve housing 14 which corresponds to twice the maximum opening width 34 of the leaf spring 28. This constriction is located approximately at the level of the valve housing 14 where the bend of the leaf spring 28 is lifted off the valve seat during the opening process.

In the adjacent third portion 42, this distance to the valve housing 14 and/or to the valve seats 25 or the convergent shell surfaces 22 is kept constant. According to the present invention, the distance at a downstream end 44 of the apertures 24 is merely twice the opening width 34 of the leaf springs 28, and/or the distance of the stopper elements 32 to the opposing inner wall 46 of the duct housing 12 substantially corresponds to the opening width 34.

The third portion 42 accordingly creates a reduction of the cross section which, in the adjacent fourth portion 47, continuously transitions into a radius 48 so that the reduction of the cross section is followed by an enlargement of the cross section which then continuously transitions into a desired connection diameter. The narrowest cross section which is located as near a place behind the downstream end 44 of the leaf spring element 28 as possible comprises a cross section that largely corresponds to the overall summed opening cross section of the two opened leaf springs 28.

If gas flows out of the outlet 26, i.e., through the apertures 24, to the outside, a relatively straight flow is produced since no cross-sectional jumps exist which would favor a swirl formation. A gap 50 between the stopper elements 32 and/or the opened leaf springs 28 is additionally kept small so that no sufficient volume for swirl formation by return flows between the valve housing 14 and the duct housing 12 is available. The main flow region at the downstream end 44 of the leaf springs 28 is further kept free from flow obstructions.

Figure 2:
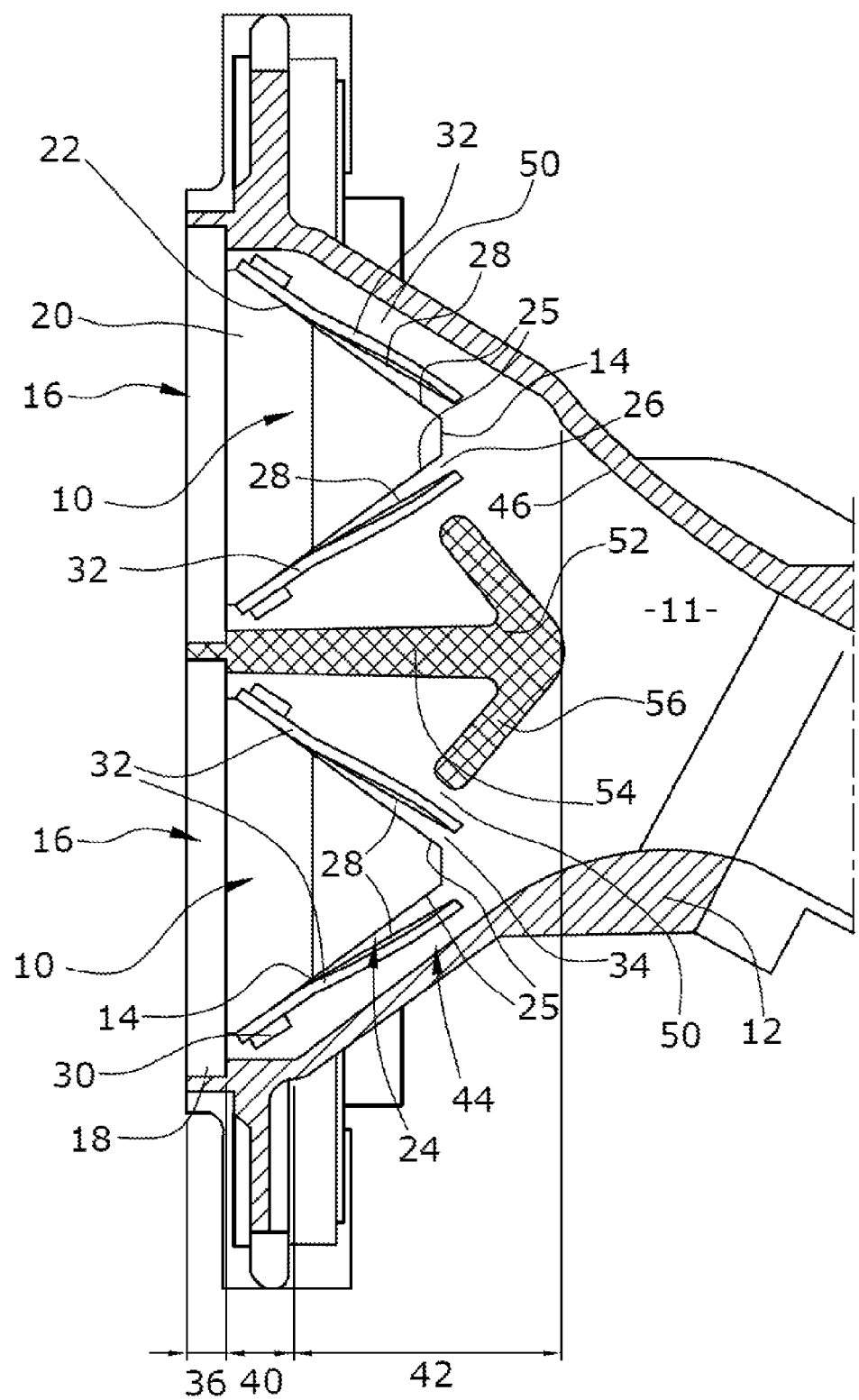
FIG. 2 shows a sectional side view of an alternative non-return valve device according to the present invention.
Figure 2A:
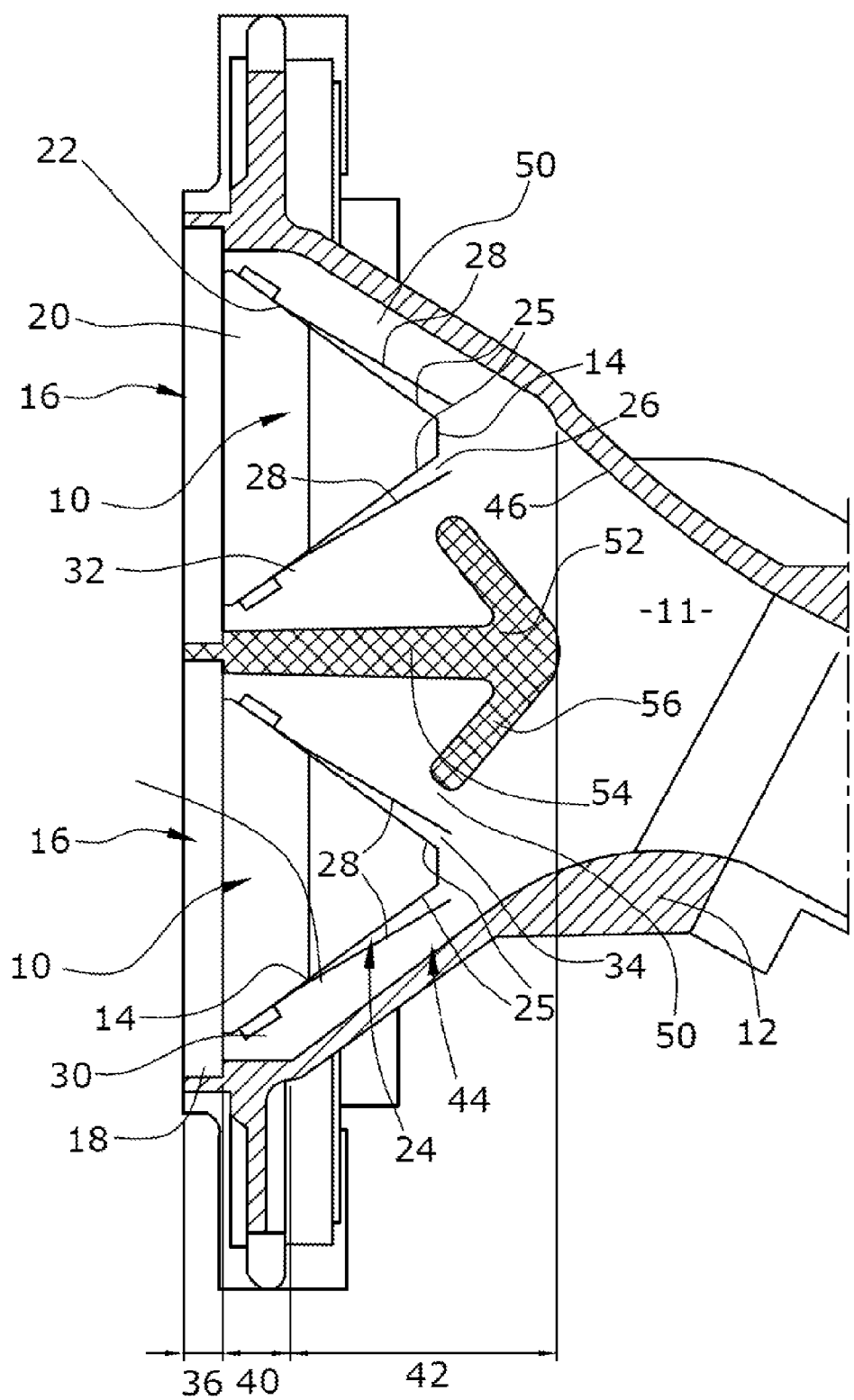
FIG. 2a shows the sectional side view of the alternative non-return valve device of FIG. 2 where the duct housing acts as the stopper element.
Figure 2B:
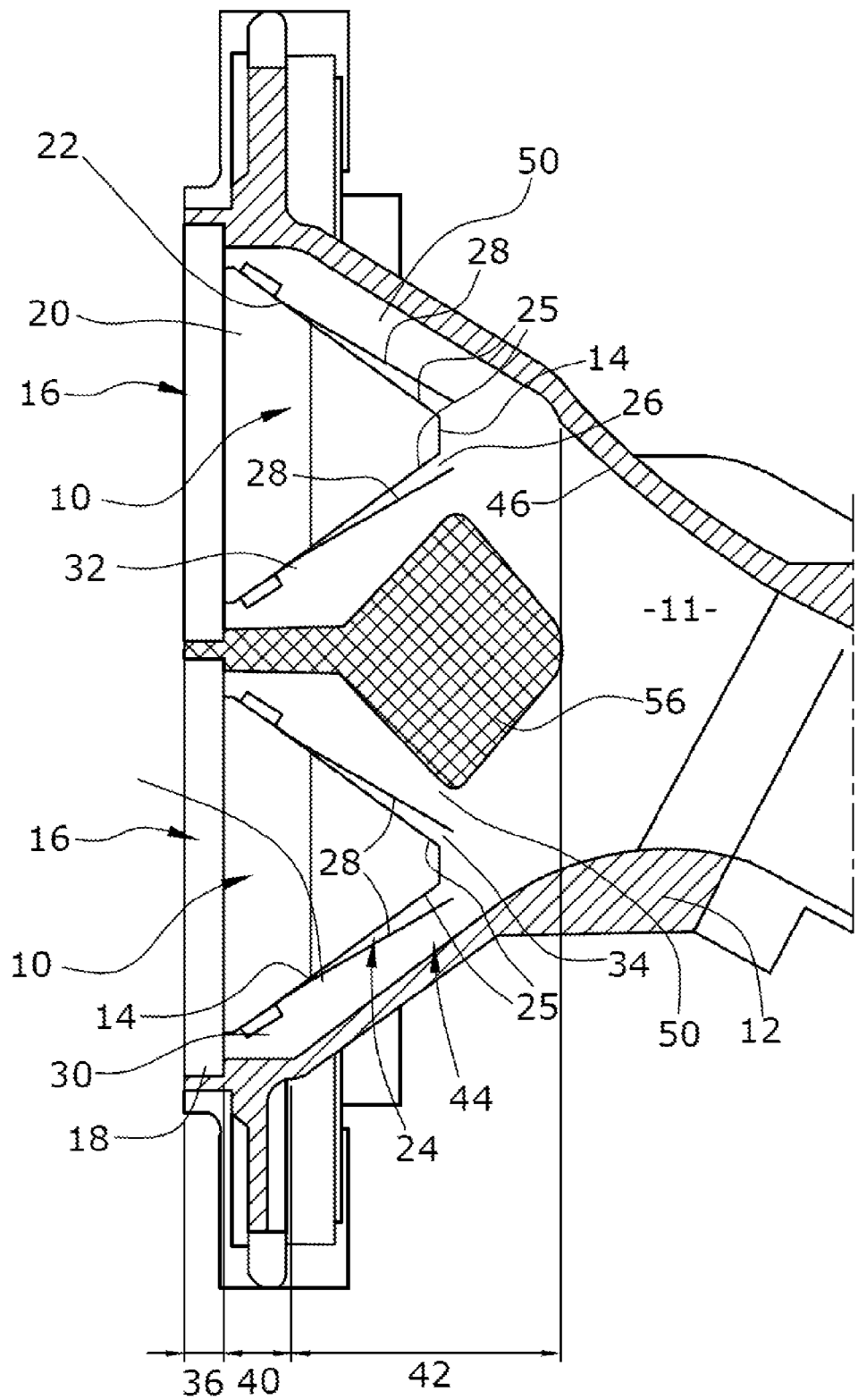
FIG. 2b shows the sectional side view of the alternative non-return valve device of FIG. 2 where the duct housing acts and the insert element act as the stopper element
Figure 3:
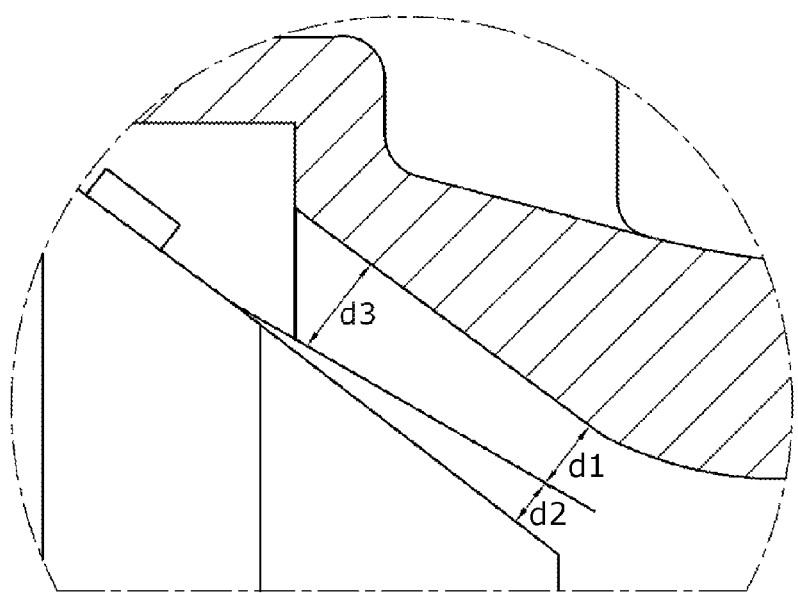
FIG. 3 is a cut-out of FIG. 1 showing the distance d1 between each leaf spring, in its maximum opening state, at the downstream end of each aperture and the opposing duct housing and/or insert element, the distance d2 between each leaf spring, in its maximum opening state, at the downstream end and the opposing valve seat, and the distance d3 showing the maximum opening width of the leaf springs.
Figure 4A:
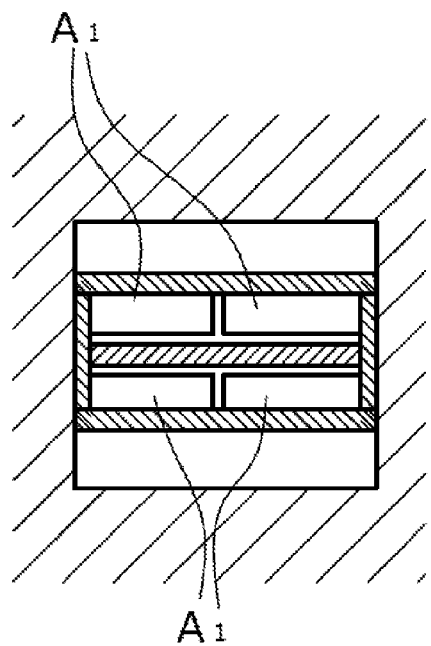
FIG. 4a shows a view along cross section IVa of FIG. 1 showing the flow cross section $A_1$ when the leaf springs are in their maximum opened position.
Figure 4B:
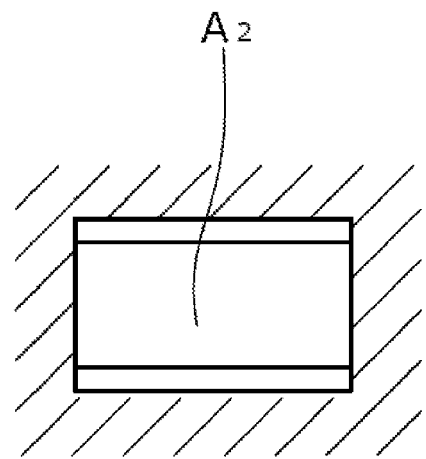
FIG. 4b shows a view along cross section IVb of FIG. 1 showing the flow cross section $A_2$ at an end of the reduced portion of the valve housing.
Figure 5:
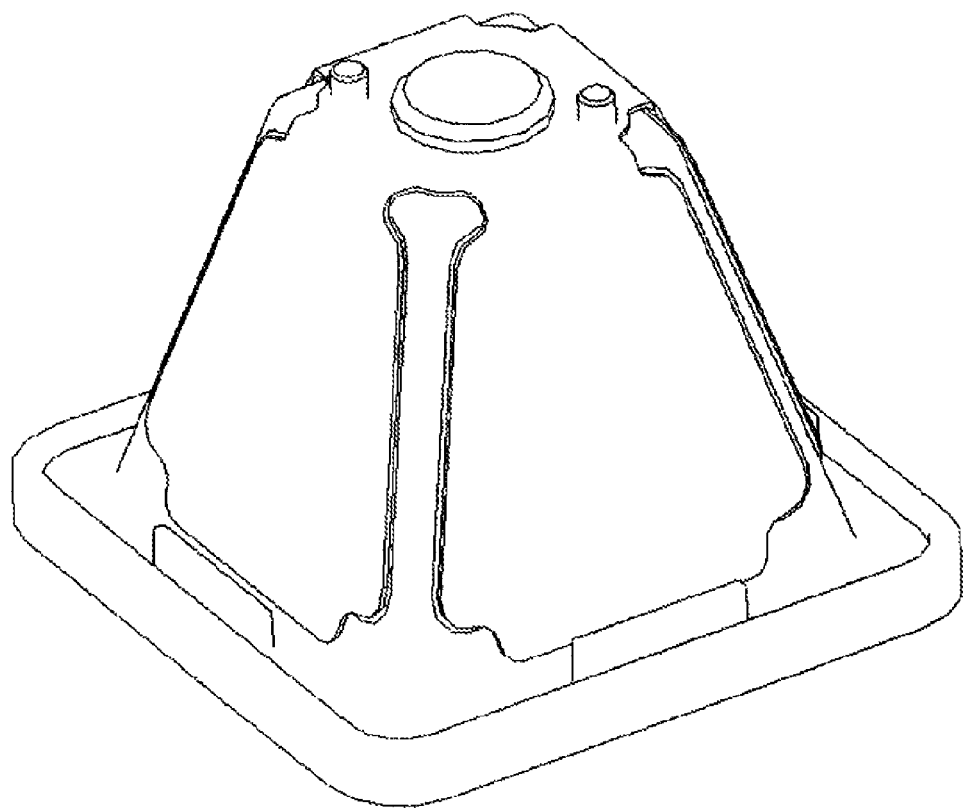
FIG. 5 shows the valve housing configured so that the each of the four valve seats are arranged in a form of a pyramid relative to each other.

The non-return valve device shown in FIG. 2 differs from the first one above in that two prism-shaped non-return valves 10 are arranged side by side in a common duct housing 12, wherein the base surfaces 18 and the parallel shell surfaces 20 of the two valve housings 14 respectively lie in a common plane so that two of the apertures 24 are arranged opposite to each other.

Between the two valve housings 14 an arrow-shaped insert element 52 is arranged whose basic arrow body 54 extends perpendicularly to the base surfaces 18 of the non-return valve 10 and substantially along the center axis of the duct housing 12, and whose arrow arms 56 are directed towards the downstream end 44 of the opposing leaf springs 28. At least the arrow arms 56 of the insert element 52 extend across the overall width of the duct 11 and end at a distance to the apertures 24 which is slightly larger than the opening width 34 of the leaf springs 28, according to the present invention.

The duct housing 12 illustrated here merely comprises the first portion 36 for accommodating the base surface 18 of the valve housings 14 and the second portion 40 with a uniform cross section adjacent to which, however, the third portion 42, not having any constriction and extending in parallel to the outer apertures 24, is arranged whose distance to the stopper elements 32 corresponds to approximately 1.5 times the maximum opening width 34 of the leaf springs 28. According to this embodiment, another reduction of the cross section is also provided downstream of the non-return valves 10, which reduction of the cross section continuously transitions into a duct extending at a slight inclination.

Swirl formations attributable to return flows caused by the small existing volumes and small gaps 50 outside the valve housings 14 between the duct housing 12 and/or the insert element 52 and the connecting elements 32 are reliably prevented. Flow obstructions in the region of the outlets are further avoided. Use in an exhaust gas line thus helps to minimize the pressure losses and thus to increase the flow rates. The resultant exhaust gas return rates lead to an increase in the efficiency of the internal combustion engine.

It is to be understood that various design changes are conceivable within the scope of the main claim. Any number of such non-return valves may thus be arranged side by side or one behind the other. When the duct housing is precisely designed, it may further serve as a stopper so that the stopper elements may be omitted. The illustrated arrow shape of the insert element may also be modified within the scope of the claims. The use of non-return valves of a different design, such as pyramid-shaped non-return valves, is also conceivable.

What is claimed is:

1. A non-return valve device for an internal combustion engine, the non-return valve device comprising:
   a duct housing comprising defining inner walls;
   a valve housing arranged in the duct housing comprising at least one aperture comprising a downstream end, the at least one aperture being configured to define a flow cross section;
   at least one valve seat configured to surround the flow cross section; and
   at least one valve closing member configured to adapt, close or open the flow cross section, the at least one valve closing member being configured as leaf springs configured to have a maximum opened position,
   wherein,
   the duct housing is configured to extend across an overall width of the valve housing in an outer region relative to the valve housing immediately in front of the downstream end of the at least one aperture,
   a first distance between each of the leaf springs in their maximum opened position at the downstream end of the at least one aperture and the duct housing arranged opposite to each of the leaf springs has a maximum which is twice as large as a second distance, the maximum opening width, between each of the leaf springs in their maximum opened position at the downstream end and the at least one valve seat arranged opposite to each of the leaf springs, and
   the defining inner walls of the duct housing downstream of the valve housing are arranged relative to each other so that, in a flow direction, the flow cross section is first continuously reduced to a reduced portion and then continuously enlarged.

2. The non-return valve device as recited in claim 1, wherein the duct housing at the downstream end of the at least one aperture serves as a stopper element.

3. The non-return valve device as recited in claim 1, wherein the valve housing at the downstream end of the at least one aperture comprises a stopper element.

4. The non-return valve device as recited in claim 1, wherein the duct housing, along a length of the leaf springs, has a distance to the at least one valve seat corresponding to at most three times the maximum opening width between the leaf spring and the valve seat.

5. The non-return valve device as recited in claim 1, wherein the valve housing is configured as a prism and comprises at least two apertures which are defined by the at least one valve seat, the at least two apertures respectively comprising a maximum distance to the duct housing corresponding to three times the maximum opening width of the leaf springs.

6. The non-return valve device as recited in claim 1, wherein the defining inner walls of the duct housing comprise radii, and the flow cross section being first continuously reduced and then continuously enlarged is defined by the radii.

7. The non-return valve device as recited in claim 1, wherein a narrowest flow cross section at an end of the reduced portion of the flow cross section corresponds at least to a sum of free flow cross section(s) of all of the at least one aperture when the leaf springs are in their maximum opened position.

8. The non-return valve device as recited in claim 1, wherein the valve housing is configured so that the at least one valve seat is arranged in a pyramid shape.

9. A non-return valve device for an internal combustion engine, the non-return valve device comprising:
   a duct housing comprising defining inner walls;
   a valve housing arranged in the duct housing comprising at least two apertures each comprising a downstream end, each of the at least two apertures being configured to define a respective flow cross section;
   at least two valve seats configured to surround a respective flow cross section;
   at least two valve closing members configured to adapt, close or open a respective flow cross section, the at least two valve closing members being configured as leaf springs configured to have a maximum opened position; and
   an insert element arranged between the valve housing, wherein,
   the duct housing and the insert element are configured to extend across an overall width of the valve housing in an outer region relative to the valve housing immediately in front of the downstream end of each of the at least two apertures,
   a first distance between each of the leaf springs in their maximum opened position at the downstream end of the at least two apertures and the duct housing or the insert element arranged opposite to each of the leaf springs has a maximum which is twice as large as a second distance, the maximum opening width, between each of the leaf springs in their maximum opened position at the downstream end and the at least one valve seat arranged opposite to each of the leaf springs, and
   the defining inner walls of the duct housing downstream of the valve housing are arranged relative to each other so that, in a flow direction, the respective flow cross section is first continuously reduced to a reduced portion and then continuously enlarged.

10. The non-return valve device as recited in claim 9, wherein the duct housing at the downstream end of the at least two apertures serves as a stopper element.

11. The non-return valve device as recited in claim 9, wherein the valve housing at the downstream end of the at least two apertures comprises a stopper element.

12. The non-return valve device as recited in claim 9, wherein the duct housing along a length of the leaf springs, has a distance to a respective one of the at least two valve seats corresponding to at most three times the maximum opening width between the leaf springs and the respective one of the at least two valve seats.

13. The non-return valve device as recited in claim 9, wherein the valve housing is configured as a prism, and the at least two apertures respectively comprise a maximum distance to the duct housing corresponding to three times the maximum opening width of the leaf springs.

14. The non-return valve device as recited in claim 13, wherein two prism-shaped valve housings are arranged side by side in the duct housing so that four valve seats and four leaf springs are arranged in parallel.

15. The non-return valve device as recited in claim 14, wherein the first distance has a maximum which is at most three times as large as the second distance along a length of the leaf springs.

16. The non-return valve device as recited in claim 14, wherein the valve housing is configured so that the each of the four valve seats are arranged in a form of a pyramid relative to each other, a distance of the four valve seats to the duct housing being configured to correspond to at most three times the maximum opening width of each leaf spring.

17. The non-return valve device as recited in claim 9, wherein the defining inner walls of the duct housing comprise radii, and the flow cross section being first continuously reduced and then continuously enlarged is defined by the radii.

18. The non-return valve device as recited in claim 9, wherein a narrowest flow cross section at an end of the reduced portion of the flow cross section corresponds at least to a sum of free flow cross sections of all of the at least two apertures when the leaf springs are in their maximum opened position.

19. The non-return valve device as recited in claim 9, wherein the insert element comprises a flow cross section which is configured as an arrow comprising arms as an arrowhead, the arms being configured to end at a distance corresponding to the maximum opened position of the leaf springs at the downstream end of the apertures.

* * * * *